United States Patent
Spickard

(10) Patent No.: US 6,637,199 B2
(45) Date of Patent: Oct. 28, 2003

(54) PRESSURE SWITCHING VALVE FOR MULTIPLE REDUNDANT ELECTROHYDRAULIC SERVO VALVE SYSTEMS

(75) Inventor: Mark Allen Spickard, Rockford, IL (US)

(73) Assignee: Woodward Governor Co., Rockford, IL (US)

(*) Notice: Subject to any disclaimer, the term of this patent is extended or adjusted under 35 U.S.C. 154(b) by 0 days.

(21) Appl. No.: 10/058,660

(22) Filed: Jan. 28, 2002

(65) Prior Publication Data

US 2003/0140625 A1 Jul. 31, 2003

(51) Int. Cl.[7] .............................................. F16D 31/02
(52) U.S. Cl. ........................................ 60/403; 91/509
(58) Field of Search ...................... 60/399, 403; 91/509, 91/32, 33; 244/227, 78

(56) References Cited

U.S. PATENT DOCUMENTS 3,763,744 A * 10/1973 Fournell et al. ............... 91/32
4,019,697 A * 4/1977 Tippetts ....................... 244/78
4,533,097 A * 8/1985 Aldrich ........................ 244/78
5,277,020 A * 1/1994 Dehu et al. ................... 60/405
6,382,076 B1 * 5/2002 Alvarez Garcia ............ 60/403

* cited by examiner

Primary Examiner—Edward K. Look
Assistant Examiner—Igor Kershteyn
(74) Attorney, Agent, or Firm—Leydig, Voit & Mayer, Ltd.

(57) ABSTRACT

A switching system is described herein for an engine having redundant control components. The switching system generally includes an actuator, a control system, inlet and outlet lines, and a transfer valve. The actuator is operable to control an engine parameter. The control system includes a first electrohydraulic servo valve and a second electrohydraulic servo valve, the first and second servo valves being fluidically connected to the actuator for operating the actuator. The inlet line supplies pressurized fluid and the outlet line drains fluid. The transfer valve is positioned between the first and second servo valves and the inlet and outlet lines. The system may further include additional control systems with redundant EHSVs. This invention minimizes size and space requirements, and allows nearly simultaneous transfer of all control systems, while minimizing the transient disturbance to the control system(s).

23 Claims, 3 Drawing Sheets

PRESSURE SWITCHING VALVE FOR MULTIPLE REDUNDANT ELECTROHYDRAULIC SERVO VALVE SYSTEMS

FIELD OF THE INVENTION

The present invention relates generally to control systems for aircraft engines, and more particularly relates to engine control systems having redundant mechanical components.

BACKGROUND OF THE INVENTION

Typically, a fuel metering unit regulates the flow of fuel to the combuster of the engine. The fuel metering unit may include an electrohydraulic servo valve (EHSV) which controls a fuel metering valve to regulate the fuel flow to the engine. It is also common to utilize other electrohydraulic servo valves to regulate other engine parameters, such as compressor variable geometry and fan variable geometry for positioning the vanes of the engine. To ensure control over these systems and of the engine, redundant electronics are employed, which typically consist of back-up electric coils in the EHSVs. The engine computer control will switch to the back-up coil for control over the system in the unlikely event the primary coil fails. In this architecture, electronic reduncancy is provided but the hydromechanical aspects are single thread.

In some aircraft engine applications, it has been found desirable to provide hydromechanical back-up in addition to electrical back-up. That is, an entire secondaryelectrohydraulic servo valve is supplied for each primary electrohydraulic servo valve. For example, there is a redundant or secondary electrohydraulic servo valve connected to operate the fuel metering valve in the event the primary electrohydraulic servo valve fails. Therefore, the system for transferring the control from a primary EHSV to a secondary EHSV now has hydromechanical as well as electronic requirements.

BRIEF SUMMARY OF THE INVENTION

One embodiment of the present invention provides a switching system for an engine having redundant control components. The switching system generally comprises an actuator, a control system, inlet and outlet lines, and a transfer valve. The actuator is operable to control an engine parameter. The control system includes a first electrohydraulic servo valve and a second electrohydraulic servo valve, the first and second servo valves being fluidically connected to the actuator for operating the actuator. The inlet line supplies pressurized fluid and the outlet line drains fluid. The transfer valve is positioned between the first and second servo valves and the inlet and outlet lines. The transfer valve is operable between a first position linking the first servo valve to the inlet and outlet lines, and a second position linking the second servo valve to the inlet and outlet lines.

According to more detailed aspects of this embodiment, the switching system may further comprise a second actuator and a second control system. The second actuator is operable to control a second engine parameter. The second control system has a third electrohydraulic servo valve and a fourth electrohydraulic servo valve, the third and fourth servo valves being fluidically connected to the second actuator for operating the second actuator. The transfer valve is positioned between the third and fourth servo valves and the inlet and outlet lines. The first position of the transfer valve links the third servo valve to the inlet and outlet lines, while the second position of the transfer valve links the fourth servo valve to the inlet and outlet lines.

Similarly, the switching system may further comprise a third actuator and a third control system. The third actuator is operable to control a third engine parameter. The third control system has a fifth electrohydraulic servo valve and a sixth electrohydraulic servo valve, the fifth and sixth servo valves being fluidically connected to the third actuator for operating the third actuator. The transfer valve is positioned between the fifth and sixth servo valves and the inlet and outlet lines. The first position of the transfer valve links the fifth servo valve to the inlet and outlet lines, while the second position of the transfer valve links the sixth servo valve to the inlet and outlet lines.

Preferably, the actuator is a fuel metering valve for regulating fuel flow to the engine. Alternately, the actuator controls compressor variable geometry or fan variable geometry. Most preferably, the actuator is a fuel metering valve for regulating fuel flow to the engine, the second actuator controls compressor variable geometry, and the third actuator controls fan variable geometry. According to other aspects of the embodiment, the inlet line is bifurcated to supply fluid at a first pressure $P_{sf}$ and a second pressure $P_c$. The transfer valve supplies fluid at $P_c$ to the servo valves of the first control system, and the transfer valve supplies fluid at $P_{sf}$ to the servo valves of the second control system.

According to another embodiment of the present invention, a switching valve is provided for switching between a primary electrohydraulic servo valve and a backup electrohydraulic servo valve of at least one control system. The servo valves are operatively connected to at least one actuator for controlling at least one engine parameter. The servo valves receive pressurized fluid from an inlet and discharge fluid to an outlet. The switching valve generally comprises a transfer valve assembly including a valve body positioned within a valve sleeve. The transfer valve assembly is interposed between the servo valves and the inlet and outlet to regulate communication between the servo valves and the inlet and outlet. The valve body is moveable within the valve sleeve to a first position linking the primary servo valve to the inlet and outlet. Further, the valve body is moveable within the valve sleeve to a second position linking the backup servo valve to the inlet and outlet. Preferably, the valve body includes at least one annulus for connecting the at least one control system to the inlet, and the valve body includes an annulus for connecting the at least one control system to the outlet.

According to yet another embodiment of the present invention, a switching system is provided for an engine having redundant control components for multiple control systems. The switching system generally comprises an inlet for supplying pressurized fuel, and an outlet for draining fuel. A first primary electrohydraulic servo valve is operatively connected to a fuel metering valve to regulate fuel flow. A first backup electrohydraulic servo valve is operatively connected to the fuel metering valve. A second primary electrohydraulic servo valve is operatively connected to an actuator to control an engine parameter. A second backup electrohydraulic servo valve is operatively connected to the actuator. Finally, a transfer valve is positioned between the servo valves and the inlet and outlet, the transfer valve being operable between a first position supplying the first and second primary servo valves with fuel, and a second position supplying the first and second backup servo valves with fuel.

Preferably, the inlet includes two lines supplying fuel at a first pressure $P_{sf}$ and a second pressure $P_c$. The first primary and first backup servo valves utilize fuel at $P_c$, and the second primary and second backup servo valves utilize fuel at $P_{sf}$. The transfer valve includes a first annulus for supplying fuel at $P_c$ to one of the first primary and first backup servo valves, and the transfer valve includes a second annulus for supplying fuel at $P_{sf}$ to one of the second primary and second backup servo valves. The transfer valve preferably includes a third annulus for draining fuel at pressure $P_0$ from the first and second primary servo valves or the first and second backup servo valves. The fuel metering unit may further comprise a third primary electrohydraulic servo valve operatively connected to a second actuator to control a second engine parameter and a third backup electrohydraulic servo valve operatively connected to the second actuator.

According to still another embodiment of the present invention, a method is provided for switching between the primary electrohydraulic servo valves and the secondary electrohydraulic servo valves of multiple control systems controlling various engine parameters. An inlet and an outlet supply and drain fluid to and from the control systems. The method comprises the steps of: providing a transfer valve between the servo valves and the inlet and outlet; and operating the transfer valve between two positions including a first position and a second position, the first position supplying fluid to and draining fluid from the primary servo valves, the second position supplying fluid to and draining fluid from the secondary servo valves. Preferably, the method further comprises the step of providing the transfer valve with an annulus for each different supply pressure utilized by the multiple control systems.

BRIEF DESCRIPTION OF THE DRAWINGS

The accompanying drawings incorporated in and forming a part of the specification illustrate several aspects of the present invention, and together with the description serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Transferring control from a primary to a secondary electrohydraulic servo valve (EHSV) involves often conflicting requirements, as will be described in detail herein. Since size and weight are critical elements, the addition of redundant EHSVs requires that the systems for transferring control therebetween be efficiently designed in terms of size and space. This is especially true where the transfer system forms a part of the fuel metering unit, which has stringent size restrictions.

Figure 1:
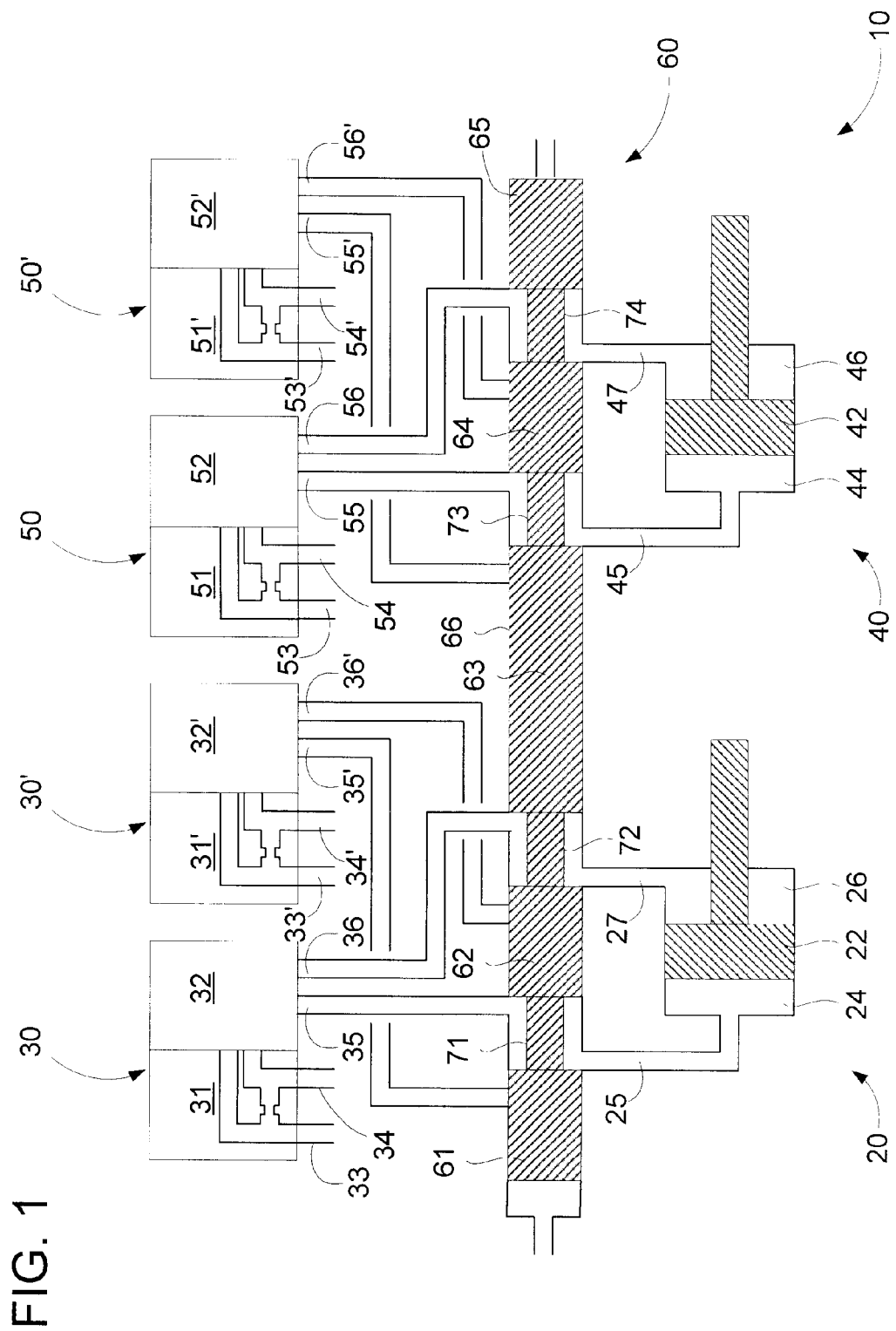
FIG. 1 is a schematic of an embodiment of an initial attempt to solve the problems addressed by the present invention.

For example, FIG. 1 depicts a schematic of an embodiment of a first attempt to provide a transfer system for redundant mechanical actuators in multiple control systems. Two actuators 20, 40 are depicted generally as pistons 22, 42, each piston having a head side 24, 44 and a rod side 26, 46. The fluid pressure at the head side 24, 44 relative to the rod side 26, 46 determines the actuation which in turn controls the engine parameter, such as the fuel flow rate to the engine, compressor variable geometry or fan variable geometry, to name a few. For each actuator 20, 40, there is a primary electrohydraulic servo valve 30, 50 (shown active in FIG. 1) and a secondary or redundant electrohydraulic servo valve 30', 50' (shown inactive in FIG. 1) for operating the actuators. Each EHSV 30, 30', 50, 50' includes a first stage valve 31, 31', 51, 51' operating a second stage valve 32, 32', 52, 52'. Each first stage valve 31, 31', 51, 51' includes an input 33, 33', 53, 53' for receiving a supply of high pressure fluid, and a drain 34, 34', 54, 54' for draining fluid at a lower pressure. Each second stage valve 32, 32', 52, 52' is connected to a head line 35, 35', 55, 55' and a rod line 36, 36', 56, 56'. The head and rod lines are operatively connected to the head and rod sides of the actuators 20, 40 for control thereof and the respective engine parameters.

A transfer valve 60 is interposed between the EHSVs 30, 30', 50, 50' and the actuators 20, 40 for determining whether the primary EHSVs 30, 50 or the secondary EHSVs 30', 50' are fluidically connected to the actuators 20, 40 for operation thereof. More specifically, the transfer valve 60 includes a valve body 66 having five lands 61, 62, 63, 64, 65 defining four annuluses 71, 72, 73, 74 for fluidically connecting the head and rod lines 35, 35', 55, 55', 36, 36', 56, 56' to the head control lines 25, 45 and the rod control lines 27, 47 of the actuators 20, 40. As depicted in FIG. 1, the primary EHSVs 30, 50 are active by way of the transfer valve's annuluses 71, 72, 73, 74 linking the head and rod lines 35, 55, 36, 56 of the EHSVs to the head and rod control lines 25, 45, 27, 47. The lands 61, 62, 63, 64 block the head and rod lines 35', 55', 36', 56' of the secondary EHSVs 30', 50' which are therefore inactive. It will be recognized that shifting the valve body 66 to the left will switch control of the actuators 20, 40 to the secondary EHSVs 30', 50', resulting in the primary EHSVs 30, 50 becoming inactive.

Unfortunately, the switching system depicted in FIG. 1, and more particularly the transfer valve 60, does not meet the size and space requirements discussed above. Since there are two output lines (35, 36, 35', 36', 55, 56, 55', 56') for each EHSV (30, 30', 50, 50'), and two EHSVs for each control system (i.e. each actuator 20, 40), the transfer valve needs to connect either the four output lines 35, 36, 55, 56, or the four output lines 35', 36', 55', 56' to the four head and rod control lines 25, 27, 45, 47. Since each EHSV output line (35, 36, 35', 36', 55, 56, 55', 56') and each actuator control line (25, 27, 45, 47) must be isolated, the single valve sleeve (not shown) requires at least 13 o-rings to separate the 12 different lines. In the situation where there are three control systems, the transfer valve would require at least 19 o-rings to separate the 18 different lines.

This switching system makes the transfer valve 60 prohibitively long. Further complicating the issue is that some control systems (e.g. compressor variable geometry and fan variable geometry) utilize relatively high flow rates, while other control systems (e.g. fuel metering unit) utilize relatively low flow rates. High flow rates require large ports, while low flow rates require stringent leakage control. These requirements can be met with large annulus widths and large port/annulus overlaps, respectively. Unfortunately, both solutions require large valve strokes and hence more valve length.

Therefore, it would seem that multiple transfer valves would be ideal to minimize the overall size. However, switching from the primary EHSVs to the secondary EHSVs must occur at essentially the same instant, which is very difficult to accomplish with multiple transfer valves. Further, multiple valves increase the amount of fluid needed to displace the valves, increasing the hydraulic transient disturbance to the control system(s). Also, the possibility of one valve failing, thus leaving the remaining control loops under control of the primary EHSVs, while the one control loop switched to the secondary EHSV, is an unacceptable failure mode. Accordingly, there existed a need for a transfer system for switching control between electrohydraulic servo valves that minimizes the transient disturbance and assures each control system is transferred at the same time, while simultaneously minimizing the size of the transfer valve.

Figure 2:
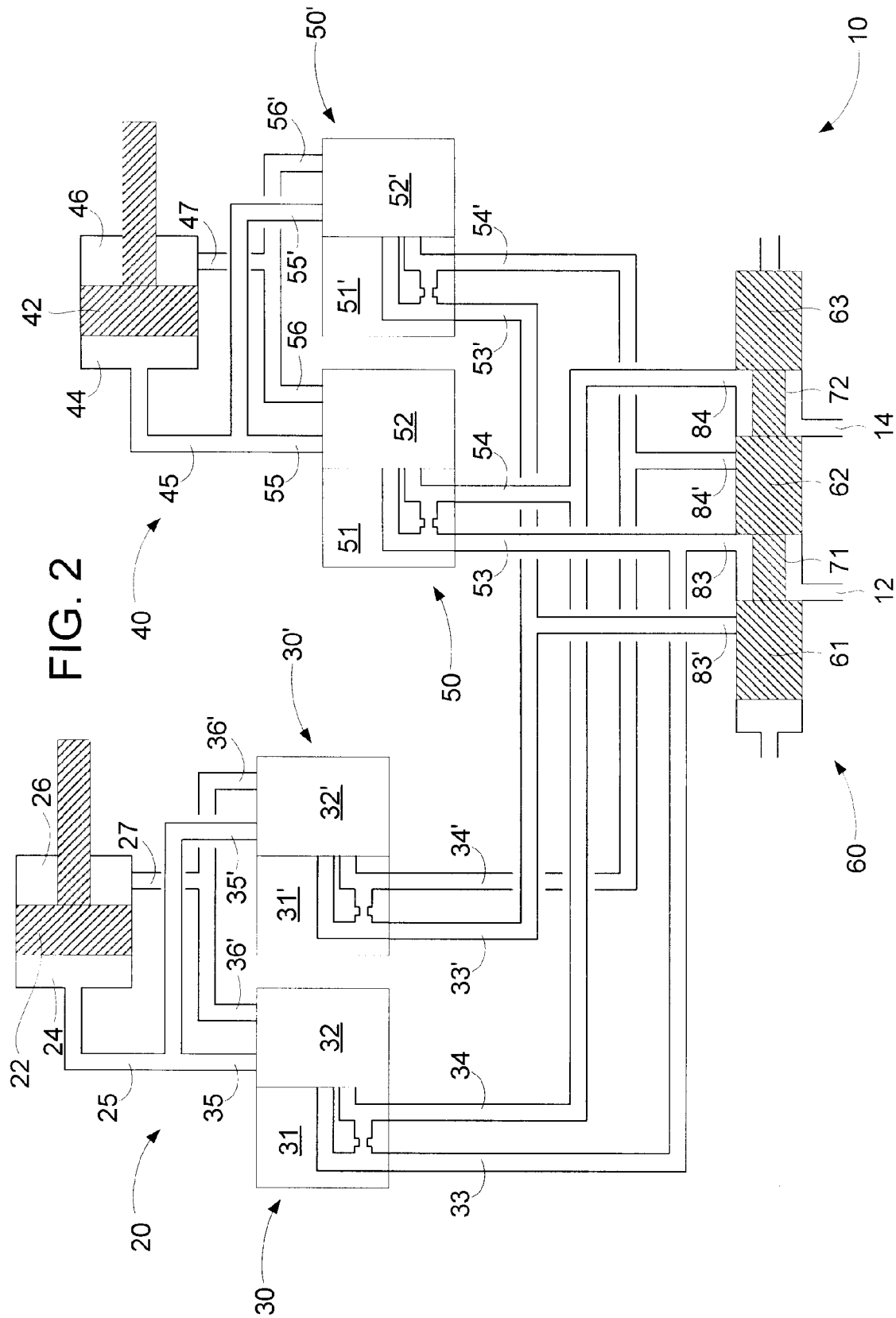
FIG. 2 is a schematic of an embodiment of the switching system constructed in accordance with the teachings of the present invention.

The present invention provides a solution to the dilemma discussed above, and a basic schematic of an embodiment of the invention is depicted in FIG. 2. Corresponding components to those discussed above with reference to FIG. 1 have been given the same reference numerals. A switching system 10 includes two actuators 20, 40 depicted generally as pistons 22, 42, each piston having a head side 24, 44 and a rod side 26, 46. For each actuator 20, 40 there is a primary electrohydraulic servo valve 30, 50 (shown active in FIG. 2) and a secondary or redundant electrohydraulic servo valve 30', 50' (shown inactive in FIG. 2) operatively connected thereto for controlling the actuators. Each EHSV 30, 30', 50, 50' includes a first stage valve 31, 31', 51, 51' operating a second stage valve 32, 32', 52, 52'. Each EHSV 30, 50 includes input lines 33, 33', 53, 53' for receiving a supply of high pressure fluid, and drain lines 34, 34', 54, 54' for draining fluid at a lower pressure. Each second stage valve 32, 32', 52, 52' is connected to a head line 35, 35', 55, 55' and a rod line 36, 36', 56, 56' for operating the actuators 20, 40.

It can be seen that the transfer valve 60 is located in a different position than the switching system depicted in FIG. 1. Here, the transfer valve 60 regulates the supply and drain of fluid to the EHSVs, rather than regulating the output of the EHSVs to the actuators. That is, inlet 12 supplies pressurized fluid to the entire system, while outlet 14 drains fluid, and the transfer valve 60 is interposed between the inlet and outlet 12, 14, and the EHSVs 30, 50, 30', 50' to regulate the flow therebetween.

As depicted in FIG. 2, the input lines 33, 53 of the primary EHSVs 30, 50 are fed from a common input line 83 leading from the transfer valve 60. Likewise, the input lines 33', 53' of the secondary EHSVs 30', 50' are fed from a common input line 83'. The drain lines 34, 54 drain to a common drain line 84, and the drain lines 34', 54' drain to a common drain line 84'. Looking at the output or control side of the EHSVs (i.e. second stage valves 32, 52, 32', 52'), head lines 35 and 35' both feed head control line 25, rod lines 36 and 36' both feed rod control line 27, head lines 55 and 55' both feed head control line 45, and rod lines 56 and 56' both feed rod control line 47. In this fashion, the EHSVs 30, 50, 30', 50' are operatively connected to the actuators 20, 40 for operation thereof and control of various engine parameters.

When the transfer valve body 66 is in the position shown in FIG. 2, input 12 feeds common input line 83 via the annulus 71. Common input line 83 bifurcates into input lines 33 and 53, whereby both of the primary EHSVs 30, 50 are fed high pressure fluid from the input 12. Similarly, drain lines 34, 54 of the primary EHSVs 30, 50 are connected to common drain line 84, which in turn is connected to outlet line 14 via annulus 72. At the same time, the piston lands 61, 62 block the secondary EHSVs from the input and outlet lines 12, 14 so that they are inactive. When the transfer valve body 66 is shifted to the left, the primary EHSVs 30, 50 are blocked from the input and drain 12, 14, while the secondary EHSVs 30', 50' are in communication with the input and drain. Input 12 feeds the common input line 83' via annulus 71, which in turn splits into input lines 33' and 53' feeding the secondary EHSVs 30', 50'. Likewise, the drain lines 34', 54' both lead to common drain line 84', which in turn is connected to drain 14 via annulus 72.

By regulating the connection between the EHSVs 30, 50, 30', 50' and the input and drain 12, 14, the valve body 66 need only have three lands 61, 62, 63 defining two annuluses 71, 72 for switching operation between primary EHSVs 30, 50 and secondary EHSVs 30', 50'. It will be recognized that for EHSVs being drained/supplied with fluid at the same pressure, one valve annulus can serve several EHSV lines. Accordingly, the reduction of the number of lands and annuluses required for the transfer valve 60 decreases the overall length of the valve and reduces the number of o-rings or seals required. The present invention, therefore, provides a switching system that uses a single transfer valve that assures each control system is transferred at the same time, minimizes the transient disturbances, while simultaneously minimizing the size of the transfer valve to within an acceptable level. Further, switching off the first stage valves of the standby EHSVs reduces leakage, and there is no head to rod leakage at the transfer valve. It will also be seen that the transfer valve length is generally not increased as additional actuators are added.

Figure 3:
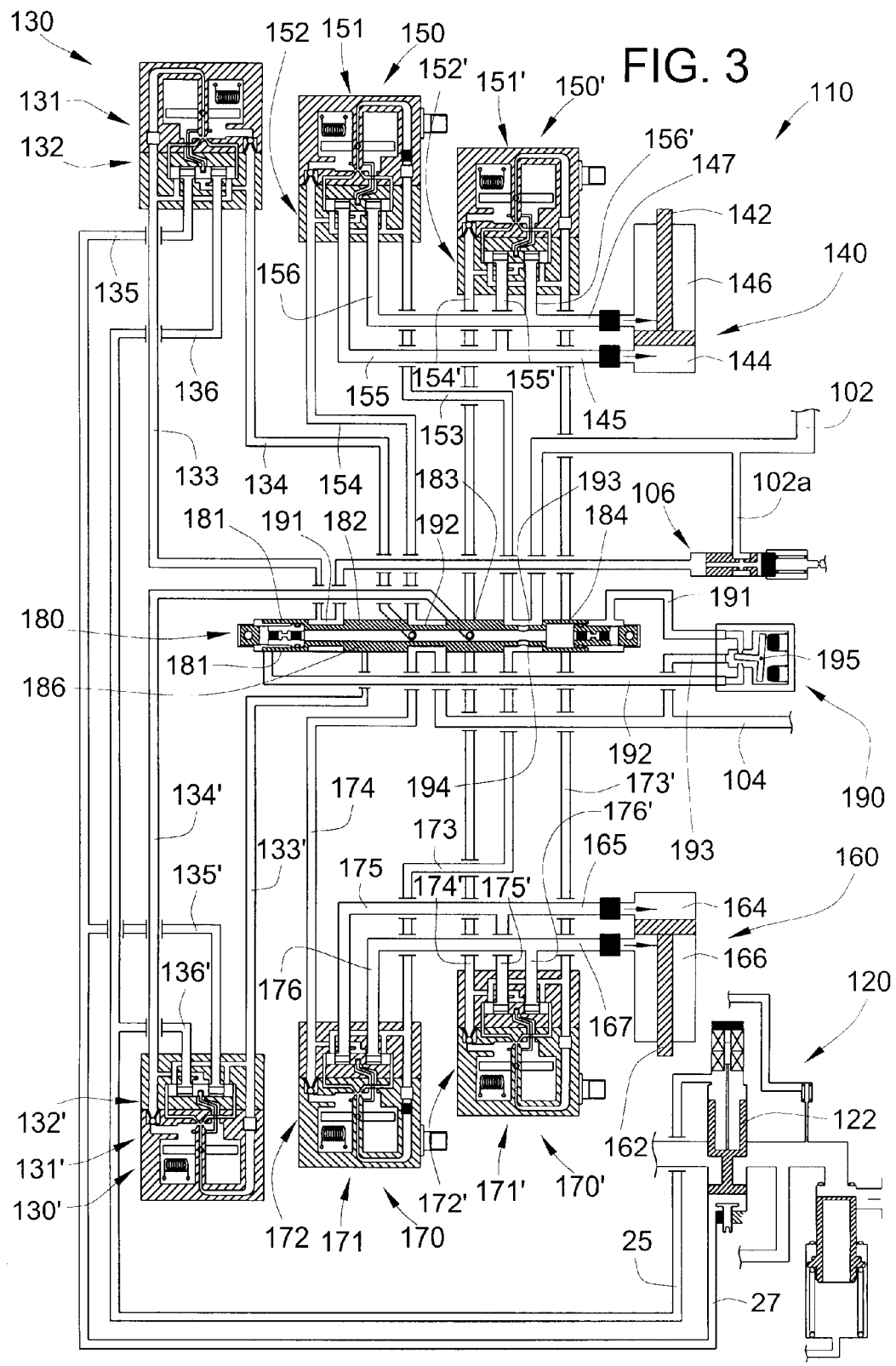
FIG. 3 is a more detailed schematic of another embodiment of the switching system, including the fuel metering unit, constructed in accordance with the teachings of the present invention.

Turning now to FIG. 3, another embodiment of the present invention is depicted in schematic form. In this embodiment, the switching systems comprises, in part, a fuel metering system having a fuel metering valve 120, as well as two actuators 140, 160 for controlling auxiliary engine parameters, preferably compressor variable geometry and fan variable geometry, respectively. In this context, the fuel metering valve can be considered an "actuator" since the valve controls an engine parameter (fuel flow rate to the combustion chambers of the engine), and since the system involves supplying two control lines with fluid at two different pressures to effect actuation.

The fuel metering valve 120 is operatively connected to a primary EHSV 130 and a secondary EHSV 130'. These EHSVs 130, 130' include a first stage valve 131, 131' operating a second stage valve 132, 132'. The EHSVs 130, 130' are supplied with fluid at pressure $P_c$ via input lines 133, 133' as dictated by the transfer valve 180. The EHSVs 130, 130' are drained via drain lines 134, 134' as determined by the transfer valve 180. The first stage valves 131, 131' control the second stage valves 132, 132', which in turn have a first output line 135, 135' and a second output line 136, 136'. The first output lines 135, 135' both feed control line 27 which is fluidically connected to a chamber at one end of the fuel metering valve body 122. The second output lines 136, 136' both feed control line 25 which is fluidically connected to the opposing side of the valve body 122. Accordingly, the relative pressures in lines 25 and 27 determine the pressures on each end of the fuel metering valve body 122, and hence the position of the valve body which determines the size of the opening through which fuel can pass as it flows to the engine, thus determining fuel flow rate.

As in prior embodiments, the system 110 includes an input 102 and a drain 104. In this embodiment, the fuel metering valve utilizes fluid at a different pressure and lower flow rate than the input pressure $P_{sf}$. As previously noted, the EHSVs 130, 130' for the fuel-metering valve 120 are supplied with fluid at pressure $P_c$. It will thus be seen that the input 102 is bifurcated and a branch line 102a feeds a $P_c$ regulator 106, which in turn feeds the annulus 191 on the valve body of the transfer valve 180 with fuel at a lower pressure $P_c$. Input 102 also feeds fuel at pressure $P_{sf}$ to annulus 193 of the valve body of the transfer valve 180. Based on the position of the valve body 186, annulus 191 is connected to either input line 133 of the primary EHSV 130, or is connected to input line 133' of the secondary EHSV 130'.

The primary and secondary EHSVs 150, 150' driving the actuator 140 controlling the fan variable geometry, are supplied with fuel at $P_{sf}$ via the annulus 193, as determined by the position of the valve body 186. Similarly, the primary and secondary EHSVs 170, 170' controlling the actuator 160 operating the compressor variable geometry, are also supplied with fuel at pressure $P_{sf}$ via the annulus 193, as determined by the position of the valve body 186. In the present embodiment, the annulus 192 operates to link all the ESHVs for all control systems (generally 120, 140, 160) to the drain 104 at a pressure $P_0$, and that pressure is the same for all control systems. Therefore, the single annulus 192 may serve all of the EHSVs 130, 130', 150, 150', 170, 170' for draining fluid therefrom. Accordingly, it can be seen that where there are common pressures involved, including either supply line pressures or drain line pressures, a single annulus on the valve body 186 may serve all such actuators and their supply or drain lines. In the present case, since the fuel metering valve 120, and more particularly its primary and secondary EHSVs 130, 130', utilize fluid at a pressure different than $P_{sf}$ which is supplied, an additional annulus 191 is provided for controlling the distribution of the same between the primary and secondary EHSVs 130, 130'. As the primary and secondary EHSVs 150, 150', 170, 170' for the actuators 140, 160 controlling fan variable geometry and compressor variable geometry, both utilize fluid at pressure $P_{sf}$, a single annulus 193 may supply the input lines 153, 153', 173, 173' for both control systems. As the fuel metering valve 120 utilizes pressure at $P_c$, annulus 191 is provided for regulating delivery of fluid at $P_c$ to one of the primary EHSV 130 and secondary EHSV 130'.

It will also be seen that a dual coil transfer EHSV 190 has been provided for controlling the position of the transfer valve 180. More particularly, the transfer valve body 186 includes an interior chamber which is supplied with fluid at pressure $P_{sf}$ via the aperture 194 located adjacent annulus 193. The fuel flows through the opposing ends of the valve body 186 through lines 191 and 192 to the transfer EHSV 190. The transfer EHSV 190 includes a flapper valve 195 which is controllably positioned by the dual coils. The flapper valve 195 is positioned relative to two nozzles connected to lines 191 and 192, respectively. It will be seen that the relative pressure at each end of the transfer valve body 186 is determined by the position of the flapper valve 195 which controls the relative pressures in lines 191, 192.

It will also be recognized by those having skill in the art that the switching system of the present invention combines the output side or control lines of the primary and secondary EHSVs of each control system. That is, the control lines 25, 27 of the fuel metering valve 120 are both linked to the output or control lines of the primary EHSV 130 and secondary EHSV 130'. More specifically, both of the first output lines 135 and 135' feed control line 27, while second output lines 136 and 136' both feed control line 25. Similarly, output lines 155 and 155' merge into head control line 145, while output lines 156 and 156' merge into rod control line 147. Likewise, the first output lines 175 and 175' merge into head control line 165, while second output lines 176 and 176' merge into rod control line 167.

As previously described, between the primary EHSVs and the secondary EHSVs of each control system, one EHSV will be active while the other is inactive. However, by virtue of the fluidic connections at the control side of the EHSVs, described in the paragraph above, the inactive EHSVs will be subject to pressure from the control lines 25, 145, 165 as well as control lines 27, 147, 167. It will be recognized by those having skill in the art that the switching system 110 must be designed to prevent leaks via the inactive EHSV output lines. This is mainly a concern for EHSVs with flow capabilities that are relatively small and thus affected to a larger degree by leakage disturbances, such as EHSVs 130, 130' in FIG. 3. Accordingly, the EHSVs 130, 130' have been eliminated of all leak paths to avoid such a problem. The first stage EHSV valves, 131, 131' include a jet nozzle that is positioned by a coil, includes a jet check valve which provides an extremely good seal to avoid such leakage problems. Further, the second stage EHSV valves, 132, 132' include adequate o-rings and seals to prevent leakage.

Similarly, those skilled in the art will recognize that there could be a net leak in or out of any of the 3 control systems due to leakage at the transfer valve 180. Accordingly, the transfer valve 180 includes the maximum overlap and has a ground valve body, and further is cut to minimize deformation, all of which helps reduce net leakage at the transfer valve.

Those skilled in the art will also recognize that there are certain failure modes created when hydraulically linking the EHSVs. For instance, when an EHSV is in standby mode, it's $P_0$ drain line is deadheaded at the transfer valve 180. This inactivates the EHSVs cover relief valve, which drains to $P_0$, and leakage into the cover cavity can cause excessive pressure, which in extreme circumstances could rupture the cover. Accordingly, the covers of the EHSVs are fluidically connected. This insures that the cover of each inactive EHSV is ported to the cover of an active EHSV, and an active cover relief valve, no mater the position of the transfer valve 180. In the embodiment depicted in FIG. 3, the cover of EHSV 130 of the fuel metering unit is connected to the cover of the primary EHSV 150, as well as that of the secondary EHSV 150' of the fan variable geometry control system. Transfer tubes link the covers of the three EHSVs 130,150, 150'. Similarly, the cover of secondary EHSV 130' of the fuel metering system has its cover fluidically connected to the covers of the primary and secondary EHSVs 170, 170' of the compressor variable geometry control system.

As previously mentioned, measures must be taken to control the leakage from one control pressure to the other within the inactive EHSV. If a feed tube within the inactive EHSV first stage were to fail, such a leak would be created regardless of previous measures. If this leak were large relative to the flow capability of the active EHSV, loss of control could result. To compensate for this, the cover relief valve cracking pressure has been set to a level that assures the active EHSV has sufficient authority to control the actuator even in the presence of the failed feed tube. The flow capability of the EHSVs 130, 130' for the fuel metering valve system are relatively low compared to the possible leak path that would be created by a failed feed tube in the first stage valve 131' of the standby EHSV 130'. For example, in the present embodiment, the cover relief valve cracking pressure in all the EHSV have been set to 75 psid minimum. This assures that if the fluid in either 135' or 136' (depending on the position of the second stage valve 132')

were to enter the cover of EHSV 130' via a cracked feed tube, neither would exit the cover relief valve of EHSV 170 (the only active EHSV with an active cover relief valve of the three EHSVs 130', 170, 170' whose covers are connected with a transfer tube) unless it were at least 75 psid above $P_0$. This assures that the active EHSV 130 can always command at least 75 psid pressure differential across the fuel metering valve 120 which provides sufficient force margin to maintain control of the system.

All of the references cited herein, including patents, patent applications, and publications, are hereby incorporated in their entireties by reference.

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A switching system for an engine having redundant control components, the switching system comprising:
   an actuator operable to control an engine parameter;
   a control system having a first electrohydraulic servo valve and a second electrohydraulic servo valve, the first and second servo valves being fluidically connected to the actuator for operating the actuator;
   an inlet line for supplying pressurized fluid;
   an outlet line for draining fluid; and
   a transfer valve positioned between the first and second servo valves and the inlet and outlet lines, the transfer valve operable between a first position linking the first servo valve to the inlet and outlet lines, and a second position linking the second servo valve to the inlet and outlet lines.

2. The switching system of claim 1, further comprising:
   a second actuator operable to control a second engine parameter;
   a second control system having a third electrohydraulic servo valve and a fourth electrohydraulic servo valve, the third and fourth servo valves being fluidically connected to the second actuator for operating the second actuator; and
   wherein the transfer valve is positioned between the third and fourth servo valves and the inlet and outlet lines, the first position of the transfer valve linking the third servo valve to the inlet and outlet lines, the second position of the transfer valve linking the fourth servo valve to the inlet and outlet lines.

3. The switching system of claim 2, further comprising:
   a third actuator operable to control a third engine parameter;
   a third control system having a fifth electrohydraulic servo valve and a sixth electrohydraulic servo valve, the fifth and sixth servo valves being fluidically connected to the third actuator for operating the third actuator; and
   wherein the transfer valve is positioned between the fifth and sixth servo valves and the inlet and outlet lines, the first position of the transfer valve linking the fifth servo valve to the inlet and outlet lines, the second position of the transfer valve linking the sixth servo valve to the inlet and outlet lines.

4. The switching system of claim 1, wherein the actuator is a fuel metering valve for regulating fuel flow to the engine.

5. The switching system of claim 1, wherein the actuator controls compressor variable geometry.

6. The switching system of claim 1, wherein the actuator controls fan variable geometry.

7. The switching system of claim 3, wherein the actuator is a fuel metering valve for regulating fuel flow to the engine, the second actuator controls compressor variable geometry, and the third actuator controls fan variable geometry.

8. The switching system of claim 2, wherein the inlet line is bifurcated to supply fluid at a first pressure $P_{sf}$ and a second pressure $P_c$, the transfer valve supplying fluid at $P_c$ to the servo valves of the first control system, the transfer valve supplying fluid at $P_{sf}$ to the servo valves of the second control system.

9. The switching system of claim 1, wherein each servo valve includes a first stage valve and a second stage valve, the servo valve receiving pressurized fluid from the inlet line via the transfer valve and returning fluid to the outlet line via the transfer valve, the second stage valve include two outlet lines connected to the actuator.

10. The switching system of claim 1, wherein the first position of the transfer valve disconnects the second servo valve from the inlet and outlet lines, and wherein the second position of the transfer valve disconnects the first servo valve from the inlet and outlet lines.

11. The switching system of claim 2, further comprising a transfer tube linking the covers of the first and second electrohydraulic servo valves.

12. The switching system of claim 3, further comprising a transfer tube linking the covers of the first, second and third electrohydraulic servo valves.

13. The switching system of claim 3, wherein each servo valve includes a cover relief valve.

14. A switching valve for switching between a primary electrohydraulic servo valve and a backup electrohydraulic servo valve of at least one control system, the servo valves operatively connected to at least one actuator for controlling at least one engine parameter, the servo valves receiving pressurized fluid from an inlet and discharging fluid to an outlet, the switching valve comprising:
   a transfer valve assembly including a valve body positioned within a valve sleeve;
   the transfer valve assembly interposed between the servo valves and the inlet and outlet to regulate communication between the servo valves and the inlet and outlet;
   the valve body moveable within the valve sleeve to a first position linking the primary servo valve to the inlet and outlet; and
   the valve body moveable within the valve sleeve to a second position linking the backup servo valve to the inlet and outlet.

15. The switching valve of claim 14, wherein the valve body includes at least one annulus for connecting the at least one control system to the inlet, and wherein the valve body includes an annulus for connecting the at least one control system to the outlet.

16. A switching system for an engine having redundant control components for multiple control systems, the switching system comprising in combination:

an inlet for supplying pressurized fuel;

an outlet for draining fuel;

a first primary electrohydraulic servo valve operatively connected to a fuel metering valve to regulate fuel flow;

a first backup electrohydraulic servo valve operatively connected to the fuel metering valve;

a second primary electrohydraulic servo valve operatively connected to an actuator to control an engine parameter;

a second backup electrohydraulic servo valve operatively connected to the actuator; and a transfer valve positioned between the servo valves and the inlet and outlet, the transfer valve operable between a first position supplying the first and second primary servo valves with fuel and a second position supplying the first and second backup servo valves with fuel.

17. The switching system of claim 16, wherein the inlet includes two lines supplying fuel at a first pressure $P_{sf}$ and a second pressure $P_c$, the first primary and first backup servo valves utilizing fuel at $P_c$, the second primary and second backup servo valves utilizing fuel at $P_{sf}$.

18. The switching system of claim 17, wherein the transfer valve includes a first annulus for supplying fuel at $P_c$ to one of the first primary and first backup servo valves, and wherein the transfer valve includes a second annulus for supplying fuel at $P_{sf}$ to one of the second primary and second backup servo valves.

19. The switching system of claim 18, wherein the transfer valve includes third annulus for draining fuel at pressure $P_0$ from one of the first and second primary servo valves and the first and second backup servo valves.

20. The switching system of claim 16, further comprising a third primary electrohydraulic servo valve operatively connected to a second actuator to control a second engine parameter and a third backup electrohydraulic servo valve operatively connected to the second actuator.

21. The switching system of claim 17, further comprising a third primary electrohydraulic servo valve operatively connected to a second actuator to control a second engine parameter and a third backup electrohydraulic servo valve operatively connected to the second actuator, the third primary and third backup servo valves utilizing fuel at $P_{sf}$.

22. A method of switching between the primary electrohydraulic servo valves and the secondary electrohydraulic servo valves of multiple control systems controlling various engine parameters, an inlet and an outlet supplying and draining fluid to and from the control systems, the method comprising the steps of:

providing a transfer valve between the servo valves and the inlet and outlet; and operating the transfer valve between two positions including a first position and a second position, the first position supplying fluid to and draining fluid from the primary servo valves, the second position supplying fluid to and draining fluid from the secondary servo valves.

23. The method of claim 22, further comprising the step of providing the transfer valve with an annulus for each different supply pressure utilized by the multiple control systems.

* * * * *